United States Patent
Valster

[11] Patent Number: 5,186,331
[45] Date of Patent: Feb. 16, 1993

[54] METHOD AND APPARATUS FOR SEPARATING BOTTLE CAPS FROM PLASTIC BOTTLES

[75] Inventor: Karl C. Valster, Pella, Iowa
[73] Assignee: Precision Pulley, Inc., Pella, Iowa
[21] Appl. No.: 770,883
[22] Filed: Oct. 4, 1991
[51] Int. Cl.$^5$ .......................... B07C 5/02; B07B 1/00
[52] U.S. Cl. .................................. 209/3.001; 100/91; 209/235; 209/680; 209/699; 209/928; 241/99
[58] Field of Search ................ 209/3.1, 606, 235, 680, 209/682, 928, 699; 241/99, 24, 79.2; 100/902, 90, 91

[56] References Cited

U.S. PATENT DOCUMENTS

| | | |
|---|---|---|
| 3,733,309 | 5/1973 | Wyeth et al. . |
| 4,153,206 | 5/1979 | Haefner et al. ...................... 241/99 |
| 4,703,899 | 11/1987 | Lodovico et al. . |
| 4,726,535 | 2/1988 | Snyder ............................ 241/81 X |
| 4,750,678 | 6/1988 | Lodovico et al. . |
| 4,923,126 | 5/1990 | Lodovico et al. . |
| 4,987,829 | 1/1991 | Hudson et al. ........................ 241/99 |
| 5,102,057 | 4/1992 | Ellis, III ................................ 241/99 |

*Primary Examiner*—Donald T. Hajec
*Attorney, Agent, or Firm*—Henderson & Sturm

[57] ABSTRACT

An apparatus having a pair of rollers disposed below an input hopper so that beverage bottles having caps thereon will be pulled between these rollers as they rotate in opposite directions, thereby compressing the bottles, and at the same time exploding the top off of the bottle. A screen is provided below the rollers for receiving the bottles and caps and the screen has openings therein larger than the caps and smaller than the bottles, whereby the caps will be collected below the screen and the bottles can pass on to a separate collection area.

8 Claims, 2 Drawing Sheets

METHOD AND APPARATUS FOR SEPARATING BOTTLE CAPS FROM PLASTIC BOTTLES

TECHNICAL FIELD

The present invention relates generally to crushing and separating equipment and more particularly to an apparatus for separating plastic beverage bottles from bottle caps so the bottles can be recycled.

BACKGROUND ART

One of the commonly recycled plastic products is carbonated beverage bottles. In a common form, these bottles are constructed primarily of polyethylene terephthalate of a generally cylindrical shape. A base which fits on the bottom of these bottles is typically made of polyethylene and is of a shape which permits the bottle to stay upright when it is placed on a flat surface. The bottle has a cap which screws onto threads in the neck of the bottle, and this cap is typically constructed of a harder plastic than the aforementioned other parts of the bottle or this cap is constructed of aluminum.

The bottles are typically returned with the caps screwed onto the bottle. For the recycling process, it is sometimes, but not always, acceptable to recycle a bottle with a plastic cap on it, but it is almost never acceptable to recycle a bottle having an aluminum cap thereon, unless this cap is separated from the other bottle parts and the caps are recycled separately from the plastic portions of the bottle.

When these carbonated beverage bottles are collected, there are almost always a mixture of bottles with aluminum caps and bottles with plastic caps. If there are any aluminum caps, then these caps must be removed and separated. In some instances, depending upon the material used, the plastic caps also need to be separated from the rest of the material to be recycled.

The most common way to solve the aforementioned problem is to hire people specifically for removing caps from bottles and separating the caps and bottles before the bottles are crushed and sent on to be recycled. This is a very time consuming and consequently, expensive proposition. Consequently, there exists a need for an easier and less expensive solution to this problem.

DISCLOSURE OF THE INVENTION

The present invention relates generally to an apparatus having a pair of rollers disposed below an input hopper so that beverage bottles having the caps thereon will be pulled between rollers as they rotate in opposite directions, thereby compressing the bottles, and at the same time exploding the top off of the bottle. A screen is provided below the rollers for receiving the bottles and caps and the screen has openings therein larger than the caps and smaller than the bottles, whereby the caps will be collected below the screen and the bottles can pass on to a separate collection area.

An object of the present invention is to provide an improved method and apparatus for separating carbonated beverage containers from caps.

Another object of the present invention is to provide an automated, less time-consuming and less expensive method and apparatus for separating the caps from carbonated beverage bottles made of non-frangible plastic material.

Other objects, advantages, and novel features of the present invention will become apparent from the following detailed description of the invention when considered in conjunction with the accompanying drawings.

BEST MODE FOR CARRYING OUT THE INVENTION

Figure 1:
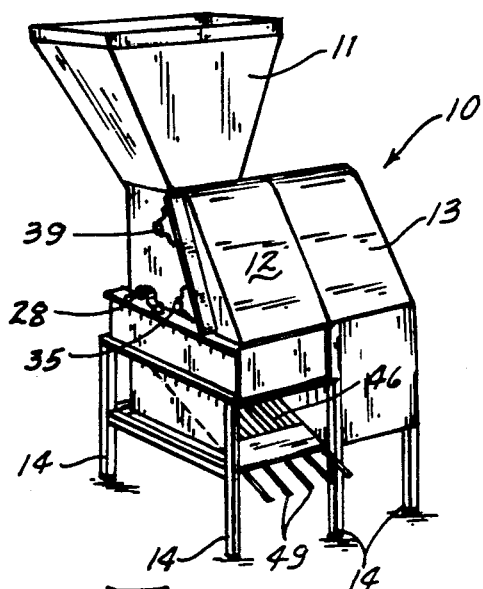
FIG. 1 is a perspective view of a preferred embodiment constructed in accordance with the present invention.
Figure 2:
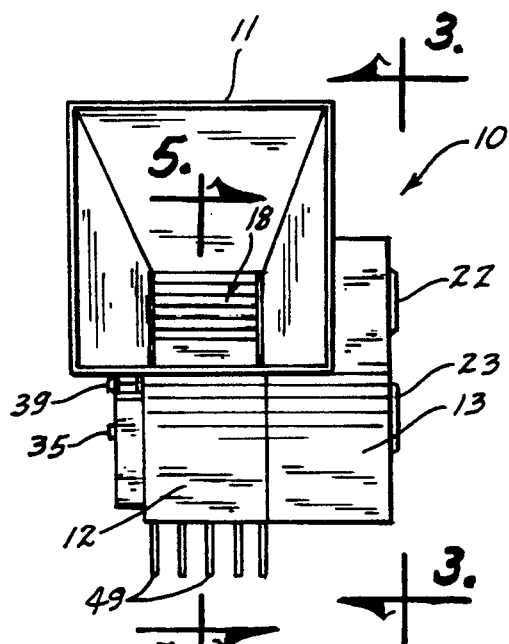
FIG. 2 is a top view of the preferred embodiment shown in FIG. 1.

Referring now to the drawings wherein like reference numerals designated identical or corresponding parts throughout the several views, FIG. 1 shows an apparatus (10) for separating bottle caps from plastic bottles, including a hopper (11) attached to a crushing and separating chamber formed by a housing (12). Another housing (13) is attached to the housing (12) for enclosing the motors and belts shown in FIG. 3. The housings (12) and (13) are supported on legs (14) to hold the apparatus (10) up off the floor.

Figure 5:
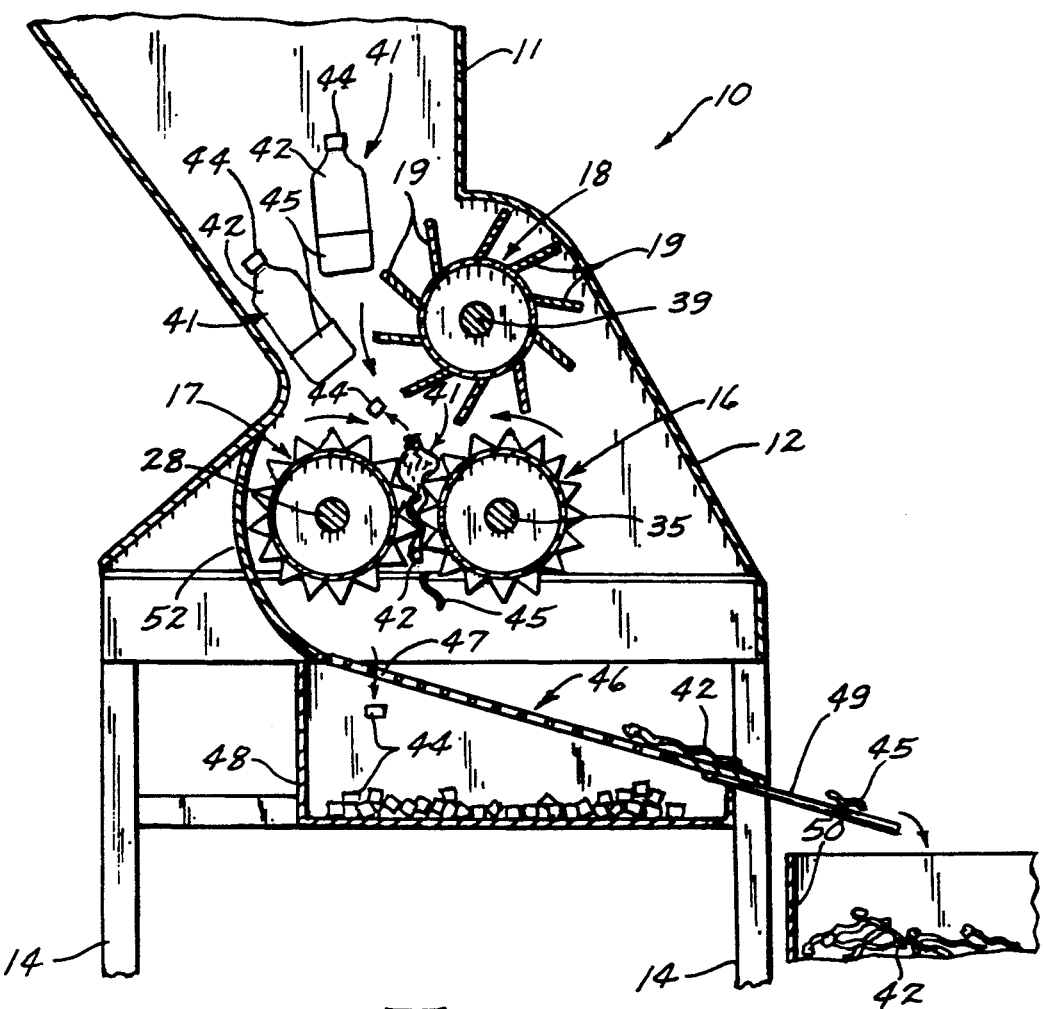
FIG. 5 is an enlarged partial cross sectional view taken along line 5—5 of FIG. 2.
Figure 6:
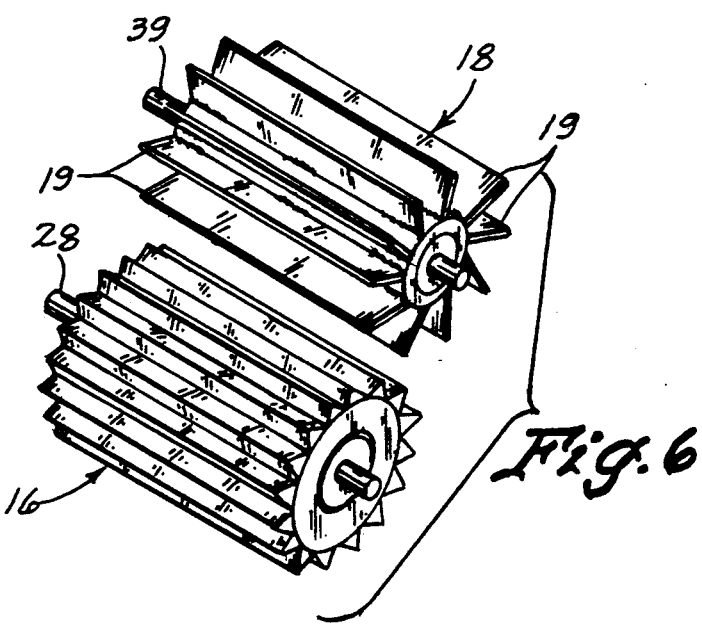
FIG. 6 is a perspective of the crushing rollers shown in FIG. 5.

Referring now to FIG. 5, it is noted that a roller (16) is rotatably mounted to housing (12) for rotation in one direction as indicated by the arrow in FIG. 5. Another roller (17) is rotatably disposed in housing (12) for rotation about an opposite direction as shown by the arrow therein in FIG. 5. Additionally, a feeding roller (18), having projections (19) thereon, is also disposed for rotation in the direction indicated by the arrow in housing (12) for the purpose of feeding bottles having caps thereon into the crushing and separating rollers (16) and (17).

Figure 3:
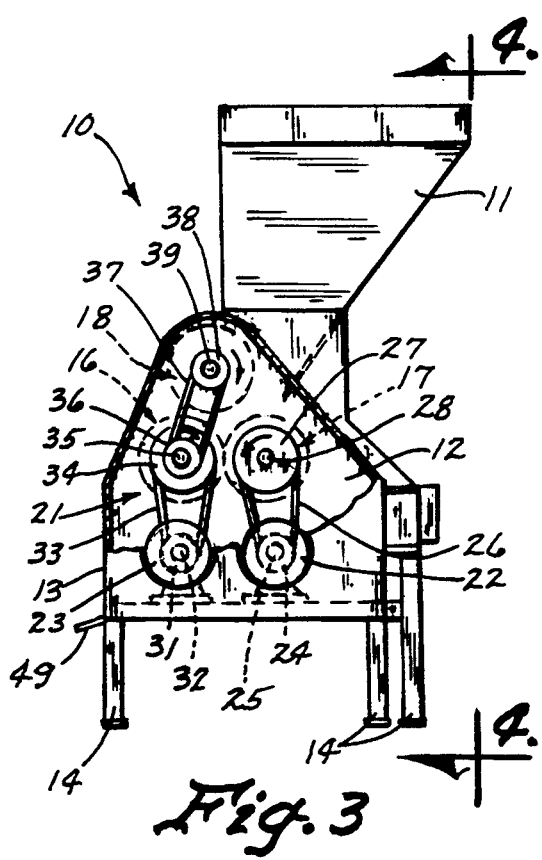
FIG. 3 is a side view taken along line 3—3 of FIG. 2 and showing a portion of the housing broken away to show how the crushing rollers and the feeding roller are powered.

Referring to FIG. 3, a power mechanism (21) is shown for turning the rollers (16) and (17), as well as the feeding roller (18). The power mechanism (21) includes a first electric motor (22) and a second electric motor (23).

The electric motor (22) has a pulley (24) attached lo to the output shaft (25) thereof for turning a belt (26) which, in turn, turns a pulley (27) and ultimately a shaft (28). The shaft (28) is rigidly attached to the crushing roller (16) as can be seen in FIG. 5.

Referring again to FIG. 3, it is noted that a pulley (31) is rigidly attached to the output shaft (32) of the electric motor (23) for driving a belt (33). This belt (33) extends around and drives a pulley (34). This drives a shaft (35), which is rigidly attached to the crushing roller (17) shown in FIG. 5.

Also rigidly attached to the shaft (35) is another pulley (36), which drives a belt (37) to turn a pulley (38). The turning of this pulley (38) turns shaft (39). The shaft (39) is rigidly attached to the feeding pulley (18).

Consequently, it will readily be appreciated that the drive system (21) shown in FIG. 3 and as described above, will rotate the crushing rollers (16) and (17) and the feeding roller (18) in the direction shown in FIG. 5 when the motors (22) and (23) are energized.

In operation, carbonated beverage bottles (41) are placed into the hopper (11), for example as shown in FIG. 5. These carbonated beverage bottles (41) are typically made of a non-frangible main portion (42) constructed of polyethylene terephthalate (P.E.T.) which is a common material used for 2-liter plastic bottles and for other carbonated beverage bottles which are smaller. The base (45) of these bottles (41) are typically made of a polyethylene (P.E.) resin and also are non-frangible, i.e. when it is crushed, it does not break into pieces. The top of the bottle has screw threads (43) as shown in FIG. 5 and the cap (44) is typically constructed either of a non-frangible aluminum with a non-frangible plastic liner for sealing therein, or it is made of another harder plastic which can be broken. These hard plastic caps also have a softer plastic piece therein for sealing purposes.

For recycling purposes, it is sometimes satisfactory to float away the plastic caps if the main portion of the bottle (42) and the bases (45) are returned to a semi liquid plastic form, such as by melting. It is almost always not acceptable to have the aluminum caps (44) mixed therein because these caps (44) interfere with making new products from the recycled plastic bottle portion (42) and bases (45).

With the power unit (21) operating in the direction shown by the arrows in FIGS. 3 and 5, the bottles (41) can be fed into the hopper (11) with or without the caps (44) screwed onto the neck portion (43). Because these bottles are almost always returned with the caps (44) attached to the bottle portion (43), those bottles (41) having caps (44) thereon must be separated from the caps (44).

Figure 4:
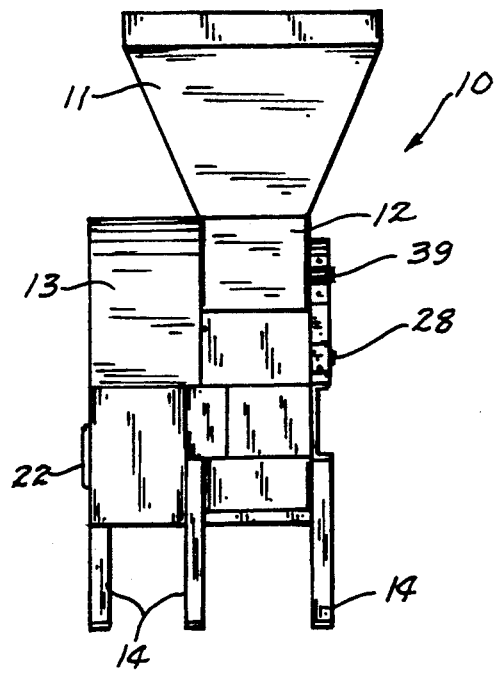
FIG. 4 is a view taken along line 4—4 of FIG. 3.

As the bottles (41) are fed into the hopper (11), the feeding roller (18) will push the bottles (41) downwardly and force them to be grabbed by the crushing rollers (16) and (17). Because the bottles (41) are cylindrical in shape and not flat like some bottles (for example as shown in FIG. 4 of U.S. Pat. No. 4,153,206), there will be sufficient air inside the bottle portion (42) to explode the cap off of the neck (43) of the bottle portion (42) as is shown in FIG. 5. This will occur whether or not the bottle feeds in in any one particular direction through the crushing rollers (16) and (17).

In a preferred form, the cap (44) would not be crushed if it feeds through the crushing rollers (16) and (17) before the rest of the bottle so that when the bottle portion is crushed, the cap (44) is still sealed onto the neck (43) so that the air within the bottle (42) will still explode the cap (44) off of the neck (43) when bottle portion (42) is crushed. This means that in a preferred embodiment, the teeth of the rollers (16) and (17) are never spaced apart closer than the widest dimension of the caps (44).

Once the bottles (41) and caps (44) pass between the rollers (16) and (17), they will drop down onto a screen (46) which has openings (47). These openings (47) are large enough to allow caps (44) to pass therethrough but are too small to permit either the base portion (45) or the main portion (42) of the bottle to pass therethrough. Gravity will consequently cause the caps (44) to fall into a receiving container (48) disposed below the screen (46). The bases (45) and crushed bottle portions (42) will pass by gravity down to a chute (49) so that the bases (45) and main bottle portions (42) will be collected in a container (50) below the inclined chute (49).

Accordingly, it will be appreciated that the preferred embodiment disclosed herein does indeed accomplish the aforementioned objects and will readily separate the recyclable parts of the bottle (41) from the caps (44) and collect the caps in a separate area from the other recyclable plastic parts. The caps (44) could also be recycled, but if both plastic and aluminum caps are present, these two types of caps would probably need to be separated first.

Obviously, many modifications and variations of the present invention are possible in light of the above teachings. It is therefore to be understood that, within the scope of the appended claims, the invention may be practiced otherwise than as specifically described.

I claim:

1. Apparatus for separating bottle caps from plastic bottles in combination with said bottles and caps, said combination comprising:

a first roller rotatable about a first axis having a plurality of projections thereon;

a second roller rotatably about a second axis substantially parallel to said first axis, said second roller having a plurality of projections thereon, said second roller being adjacent to said first roller and defining a space between said first and second rollers;

an input hopper means for receiving and guiding bottles;

said bottles being constructed entirely of flexible non-frangible plastic and having said caps thereon, said bottles with caps thereon being disposed in said input hopper means, said bottles being substantially wider than the space between said rollers;

means for turning said first roller so that a top portion thereof moves toward said second rollers;

means for turning said second roller so that a top portion thereof moves toward said first roller, whereby turning of said first and second rollers forces said bottles between said first and second rollers and forces said cap off of said bottle as it is crushed between said rollers;

screen means for receiving said bottle and caps and having openings therein larger than said caps and smaller than said bottle whereby said caps will pass through said openings but said bottle will not; and means disposed downwardly from said screen means for receiving said crushed bottle whereby the bottle caps will be separated from said bottles.

2. The apparatus of claim 1 including paddle means disposed in said hopper means for urging said bottles from said hopper means toward said first and second rollers.

3. The apparatus of claim 1 including means disposed below said screen means for catching said caps which pass through said screen means.

4. The apparatus of claim 1 wherein said caps are constructed of a non-frangible material.

5. The apparatus of claim 4 wherein at least some of said caps are comprised of aluminum.

6. The apparatus of claim 1 wherein said bottles include a main portion to which said caps are initially attached and a base portion for allowing the bottles to set upright, said base portions being larger than said caps.

7. The apparatus of claim 1 wherein the closest distance between said first and second rollers is wider than the greatest dimension of one of said caps.

8. A method of separating bottle caps from plastic bottles using an apparatus of a type including: a first roller rotatable about a first axis having a plurality of projections thereon; a second roller rotatable about a second axis substantially parallel to said first axis, said second roller having a plurality of projections thereon, said second roller being adjacent to said first roller and defining a space between said first and second rollers; an input hopper means for receiving and guiding bottles; plastic bottles having caps thereon disposed in said input hopper means, said bottles being substantially wider than the space between said rollers; means for turning said first roller so that a top portion thereof moves toward said second roller; means for turning said second roller so that a top portion thereof moves toward said first roller, whereby turning of said first and second rollers forces said bottles between said first and second rollers and forces said cap off of said bottle as it is brushed between said rollers; screen means for receiving said bottle and caps and having openings therein larger than said caps and smaller than said bottle whereby said caps will pass through said openings but said bottle will not; an means disposed downwardly from said screen means for receiving said crushed bottle whereby the bottle caps will be separated from said bottles; said method comprising:

placing beverage bottles constructed entirely of flexible non-frangible plastic and having caps disposed thereon in said hopper means;

crushing said bottles to cause the air disposed within each of said bottles to blow the respective caps off of said bottles by turning said first and second rollers and thereby forcing said bottles to pass between said first and second rollers; and using said screen means to collect said caps in one area and said crushed bottles in another area.

* * * * *